United States Patent [19]

Douskey et al.

[11] Patent Number: 5,668,816
[45] Date of Patent: Sep. 16, 1997

[54] METHOD AND APPARATUS FOR INJECTING ERRORS INTO AN ARRAY BUILT-IN SELF-TEST

[75] Inventors: Steven Michael Douskey; Paul W. Wong, both of Rochester, Minn.

[73] Assignee: International Business Machines Corporation, Armonk, N.Y.

[21] Appl. No.: 697,036

[22] Filed: Aug. 19, 1996

[51] Int. Cl.⁶ .................................................. G06F 11/08
[52] U.S. Cl. ............................. 371/21.3; 95/183.06
[58] Field of Search ........................ 371/21.3, 21.2, 371/22.5, 22.6; 364/265.3; 395/183.18, 183.06

[56] References Cited

U.S. PATENT DOCUMENTS

| | | | |
|---|---|---|---|
| 4,669,081 | 5/1987 | Mathewes, Jr. et al. | 371/3 |
| 4,835,459 | 5/1989 | Hamlin et al. | 324/73 |
| 4,875,209 | 10/1989 | Mathewes, Jr. et al. | 371/3 |
| 5,058,112 | 10/1991 | Namitz et al. | 371/3 |
| 5,130,988 | 7/1992 | Wilcox et al. | 371/22.3 |
| 5,184,308 | 2/1993 | Nagai et al. | 364/489 |
| 5,428,624 | 6/1995 | Blair et al. | 371/22.3 |
| 5,450,414 | 9/1995 | Lin | 371/22.3 |
| 5,475,624 | 12/1995 | West | 364/578 |
| 5,506,959 | 4/1996 | Cockburn | 395/183.18 |
| 5,535,164 | 7/1996 | Adams et al. | 371/21.1 |

*Primary Examiner*—Vincent P. Canney
*Attorney, Agent, or Firm*—Joan Pennington

[57] ABSTRACT

An improved method and apparatus are provided for injecting errors in an array built-in self-test (ABIST) for an array in an integrated circuit driven by at least one controller. The error generation and insertion apparatus is used with the ABIST and includes registers that are set for selecting error injection; for selecting a predetermined ABIST test pattern; and for selecting an address in the array for injecting an error in the predetermined ABIST test pattern. An ABIST pattern is compared with the selected predetermined ABIST test pattern, and the selected address in the array for injecting the error is compared with an ABIST address for the ABIST pattern. The ABIST data is inverted responsive to the selected address in the array for injecting the error equal to the ABIST address. A single bit error or a multiple bit error is selected for an address or all addresses of the array.

12 Claims, 2 Drawing Sheets

METHOD AND APPARATUS FOR INJECTING ERRORS INTO AN ARRAY BUILT-IN SELF-TEST

FIELD OF THE INVENTION

The present invention relates generally to built-in self-testing of memory arrays, and more particularly, to a method and apparatus for injecting errors in a built-in self-test (BIST) for an array in an integrated circuit driven by controller(s).

DESCRIPTION OF THE PRIOR ART

During manufacture of integrated circuits, manufacturers rely on sophisticated testers to test the chips via external pins. Test stimulus are applied via external pins to the inputs and the outputs are observed. Typical manufacturing defects include shorts, opens, stuck-at-1, stuck-at-0, and the like. As integrated circuit technology improves, more and more logic can be packed into a single package (chip). Single chip microprocessors, as an example, include millions of transistors including multiple memory arrays and logic. A limited number of pins exist on a chip package and the number of pins a tester can handle is limited. The technology trend is to move some of the hardware for testing onto the IC chip. On-chip testing hardware is used to test the chip, such as, a built-in self-test (BIST) hardware.

BIST is typically distinguished by array built-in self-test (ABIST), and logic built in self test (LBIST). ABIST utilizes predetermined test data patterns for testing memory arrays, while LBIST utilizes pseudorandom number sequences for logic testing. BIST is gaining in popularity since it is a portable test when properly designed. BIST can be used in wafer, chip, module, card, and system testing, for example during power on system test (POST). Also the cost of BIST, aside from chip area and engineering time, is generally low and the performance degradation caused by BIST is typically minimal.

System testing is one of the most valuable assets of BIST to greatly enhance machine reliability. Every time a machine is powered on during a power-on-reset (POR) system test, the system can automatically run BIST to ensure all components are working properly. ABIST can be arranged to run during the POR system test.

The increasing use of BIST, particularly ABIST, presents new problems. A need exists to verify that ABIST is working properly. In order to verify so-called fault paths or the part of hardware and software that operate when the normal function is in error, an apparatus and method to force errors in the array is needed.

SUMMARY OF THE INVENTION

Important objects of the present invention are to provide an improved method and apparatus for injecting errors in an array built-in self-test (ABIST) for an array in an integrated circuit driven by at least one controller; to provide such error injection apparatus and method substantially without negative effects and that overcome some disadvantages of prior art arrangements.

In brief, an improved method and apparatus are provided for injecting errors in an array built-in self-test (ABIST) for an array in an integrated circuit driven by at least one controller. The error generation and insertion apparatus is used with the ABIST and includes registers that are set for selecting error injection; for selecting a predetermined ABIST test pattern; and for selecting an address in the array for injecting an error in the predetermined ABIST test pattern. An ABIST pattern is compared with the selected predetermined ABIST test pattern, and the selected address in the array for injecting the error is compared with an ABIST address for the ABIST pattern. The ABIST data is inverted responsive to the selected address in the array for injecting the error equal to the ABIST address.

In accordance with features of the invention, a single bit error or a multiple bit error is selected for an address or all addresses of the array.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
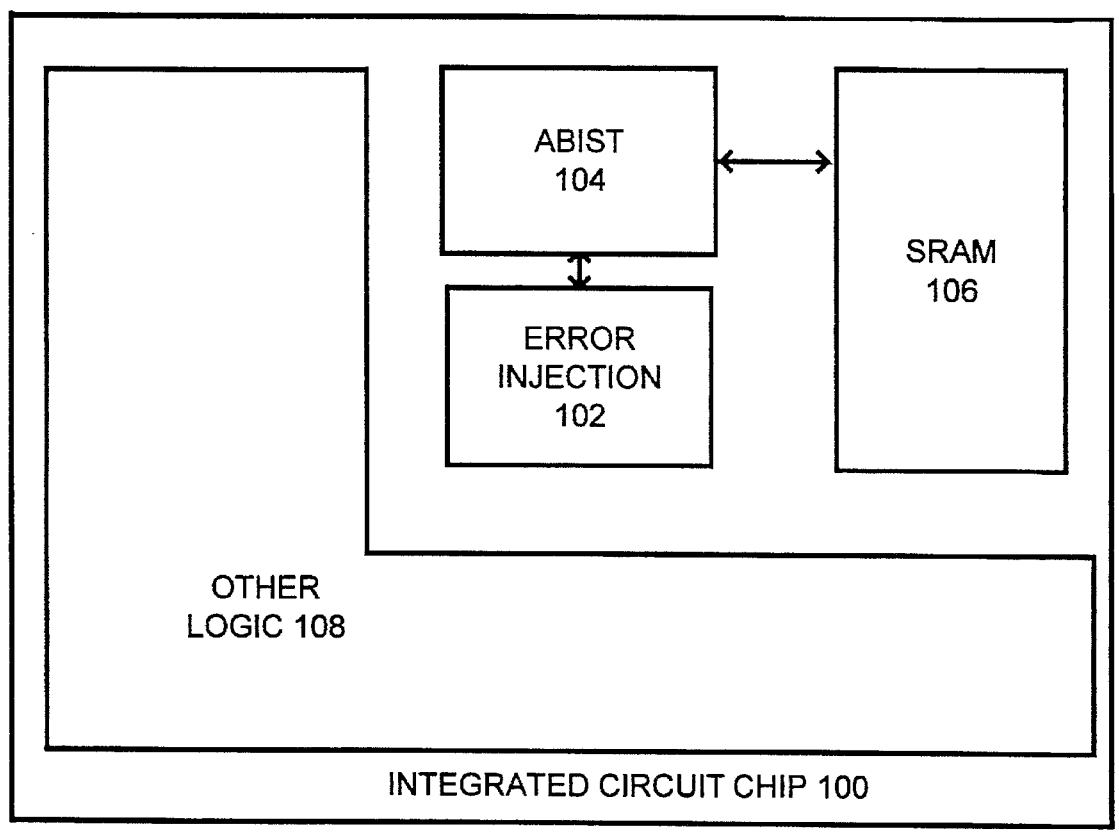
FIG. 1 is a schematic block diagram representation of an error generation and injection apparatus used with an array built-in self-test (ABIST) in accordance with the invention together with an exemplary memory array and other circuitry.

Having reference now to the drawings, in FIG. 1 there is shown an integrated circuit chip 100 including an error generation and injection apparatus 102 and an array built in self test (ABIST) 104 in accordance with a preferred embodiment of the invention together with an exemplary memory array, static random access memory (SRAM) 106 and other logic circuitry 108. In accordance with features of the present invention, error generation and injection apparatus 102 is functionally connected to ABIST 104 to provide a simulated failure while running ABIST 104 to exercise a FAIL path and that is used to verify that ABIST 104 is working properly. Multiple error types can be provided including a single bit, a multiple bit for a single address or all addresses in the memory array 106 for a specific ABIST test pattern and test cycle, while hardware overhead is minimized.

ABIST 104 provides test data, read/write controls to SRAM array 106 and compares expected data with test data to identify an array failure. ABIST 104 uses predetermined deterministic patterns, such as checkerboard, blanket zero initialization, to test the array 106. In blanket zero initialization test pattern, for example, the entire array 106 is first initialized by writing all zeros sweeping throughout the whole address space of SRAM 106, then every location is read and compared against expected zero result. Error generation and injection apparatus 102 is used with ABIST 104 providing the capability to inject a selected error or errors into the array 106. Error generation and injection apparatus 102 is used with ABIST 104 for either an embedded array 106 or an external array 106.

Figure 2:
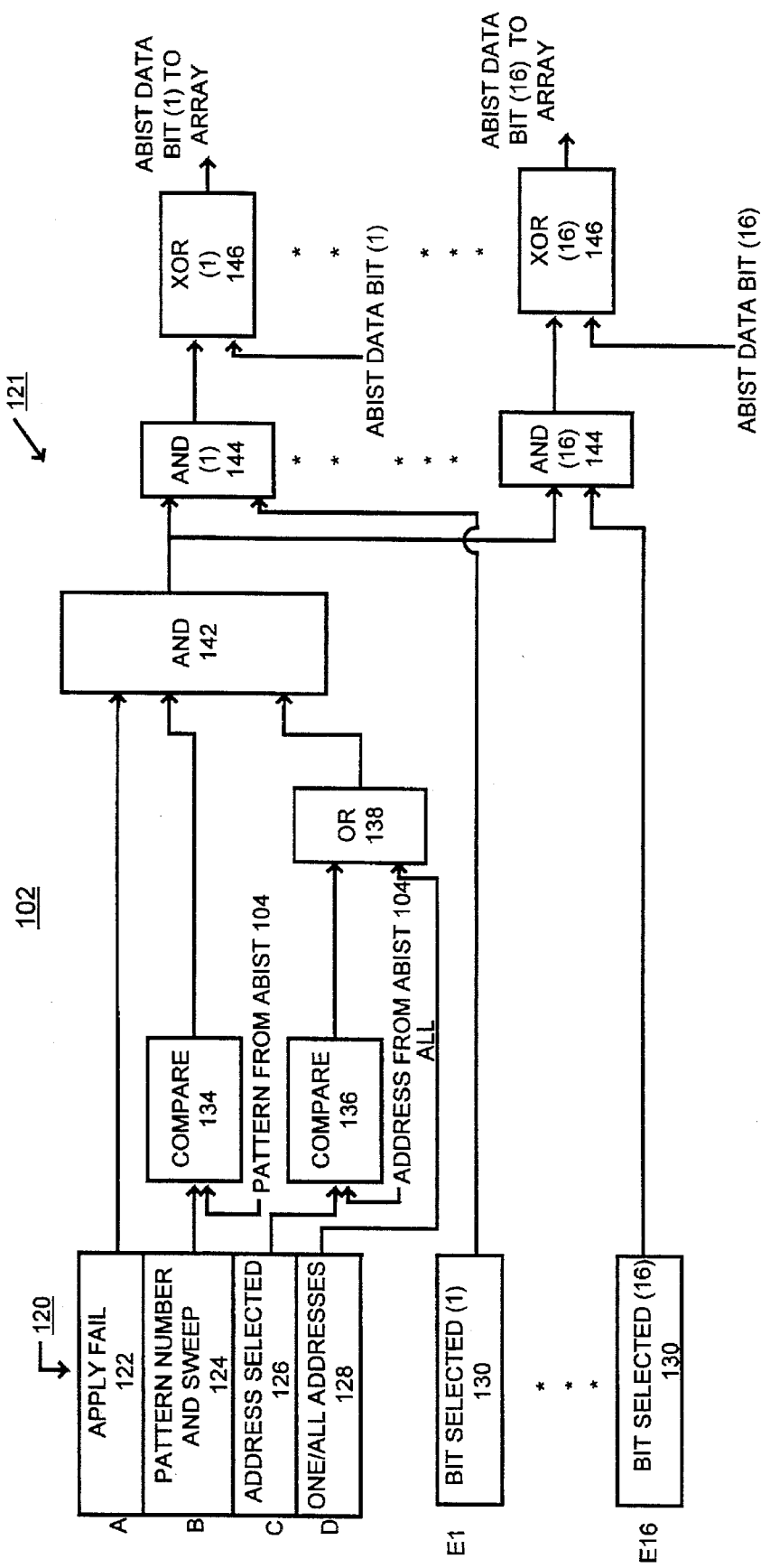
FIG. 2 is a more detailed schematic diagram representation of the error generation and injection apparatus used with an array built in self test (ABIST) of FIG. 1 in accordance with the invention.

Referring to FIG. 2, an exemplary arrangement of error generation and injection apparatus 102 is shown. Error generation and injection apparatus 102 includes an error selection register generally designated by 120 including registers 122, 124, 126, 128, and 130 (1–16), A–D, E1–E16, inclusive, and logic generally designated by 121 including compare functions 134, 136, an OR gate 138, an AND gate 142, a plurality of AND gates (1–16) 144 and a plurality of exclusive-or (XOR) gates (1–16) 146.

Selected error or errors are accomplished by setting bits in the error selection register 120. The error selection register 120 includes register 122 A for applying a failure selection, register 124 B for selecting a pattern number and sweep, register 126 C for selecting an address, register 128 D for selecting one or all addresses, registers 130 E1–E16 for selecting a single bit error or a multiple bit error for a selected address or all addresses of the array 106.

As shown in FIG. 2, the failure selection of register 122 A is applied to a first input of AND gate 142. Compare functions 134 and 136 compare the state of registers 124 B and 126 C with the state of ABIST 104 providing a gating function for the error generation and insertion apparatus 102. The selected pattern number and sweep of register 124 B and a pattern from ABIST 104 are applied to the compare function 134. The output of compare function 134 is applied to a second input of AND gate 142. The selected address of register 126 C and an address from ABIST 104 are applied to the compare function 136. The output of compare function 136 is ORed with the one or all addresses selection of register 128 D by OR gate 138 and applied to a third input of AND gate 142. The bit selected (1)–(16) of registers 130 E1–E16 is ANDed with the output of AND gate 142 by a respective AND gate (1)–(16) 144 and applied to a respective exclusive-or (XOR) gate (1)–(16) 146. The output of each of the AND gates (1)–(16) 144 is exclusive ORed with a respective ABIST data bit (1)–(16) by the respective XOR gate (1)–(16) 146 and applied to the SRAM 106 providing the ABIST data with the injected error or errors written into the SRAM 106.

In operation of error generation and injection apparatus 102, a single bit error can be injected during the ABIST blanket zero initialization, which should be detected during the blanket zero read by ABIST 104. A single bit error at a single address is generated by setting the error selection register 122 as follows: register 122 A=yes, register 124 B=blanket zero initialization test, register 126 C=selected address, register 128 D=one address, one of registers 130 E1–E16=selected bit. The error selection logic is activated with register 122 A set true, and the selected bit will be inverted and written as a one into the array 106 at the selected address during the write operation for the blanket zero initialization test.

A whole data word error to a selected address is generated by error generation and injection apparatus 102 by setting: register 122 A=yes, register 124 B=selected pattern, register 126 C=selected address, register 128 D=one address, all registers 130 E1–E16=selected bit.

One bit error in all addresses is generated by error generation and injection apparatus 102 by setting: register 122 A=yes, register 124 B=selected pattern, register 128 D=all addresses, one of registers 130 E1–E16=selected bit.

A word or all bits in all addresses is generated by error generation and injection apparatus 102 by setting: register 122 A=yes, register 124 B=selected pattern, register 128 D=all addresses, all registers 130 E1–E16=selected bit.

As shown in FIG. 2, gating and comparison paths of the error generation and injection apparatus 102 do not interfere with timing paths of the ABIST data with the injected error or errors applied to the array 106. It should be understood that the error generation and injection apparatus 102 may be simplified by reducing the error injection functions. For example, if a single-bit error is sufficient for testing a particular design, register 128 D, the OR gate 138, and all but one of the all registers 130 E1–E16, AND gates 144 and XOR gates 146 can be eliminated.

While the present invention has been described with reference to the details of the embodiments of the invention shown in the drawing, these details are not intended to limit the scope of the invention as claimed in the appended claims.

What is claimed is:

1. Apparatus for injecting errors in an array built-in self-test (ABIST) for an array in an integrated circuit comprising:

means coupled to the ABIST for selecting error injection;

means coupled to the ABIST for selecting a predetermined ABIST test pattern; and means coupled to the ABIST for selecting an address in the array for injecting an error in said predetermined ABIST test pattern.

2. Apparatus for injecting errors in a built-in self-test (BIST) for an array as recited in claim 1 wherein said means coupled to the ABIST for selecting error injection includes a register, said register being set for selecting error injection.

3. Apparatus for injecting errors in a built-in self-test (BIST) for an array as recited in claim 1 further includes means for selecting one or all addresses in the array for injecting said error in said predetermined ABIST test pattern.

4. Apparatus for injecting errors in a built-in self-test (BIST) for an array as recited in claim 1 wherein said means coupled to the ABIST for selecting said address in the array for injecting said error in said predetermined ABIST test pattern includes means for injecting a single bit error.

5. Apparatus for injecting errors in a built-in self-test (BIST) for an array as recited in claim 1 wherein said means coupled to the ABIST for selecting said address in the array for injecting said error in said predetermined ABIST test pattern includes means for injecting a multiple bit error.

6. Apparatus for injecting errors in a built-in self-test (BIST) for an array as recited in claim 1 further includes means for selecting one address or all addresses in the array for injecting said error in said predetermined ABIST test pattern and means for injecting a single bit error at said selected one address or said selected all addresses in the array.

7. Apparatus for injecting errors in a built-in self-test (BIST) for an array as recited in claim 1 further includes means for selecting one address or all addresses in the array for injecting said error in said predetermined ABIST test pattern and means for injecting a multiple bit error at said selected one address or said selected all addresses in the array.

8. A method for injecting errors in an array built-in self-test (ABIST) for an array in an integrated circuit utilizing error generation and insertion apparatus coupled to the ABIST comprising the steps of:

utilizing said error generation and insertion apparatus for selecting error injection; for selecting a predetermined ABIST test pattern; and for selecting an address in the array for injecting an error in said predetermined ABIST test pattern;

comparing an ABIST pattern with said selected predetermined ABIST test pattern;

comparing said selected address in the array for injecting said error with an ABIST address for said ABIST pattern; and inverting said ABIST data responsive to said selected address in the array for injecting said error equal to said ABIST address for said ABIST pattern.

9. A method for injecting errors in an array built-in self-test (ABIST) as recited in claim 8 includes the step of utilizing said error generation and insertion apparatus for selecting a single bit error for said selected address.

10. A method for injecting errors in an array built-in self-test (ABIST) as recited in claim 8 includes the step of utilizing said error generation and insertion apparatus for selecting a single bit error for all addresses of the array.

11. A method for injecting errors in an array built-in self-test (ABIST) as recited in claim 8 includes the step of utilizing said error generation and insertion apparatus for selecting a multiple bit error for said selected address.

12. A method for injecting errors in an array built-in self-test (ABIST) as recited in claim 8 includes the step of utilizing said error generation and insertion apparatus for selecting a multiple bit error for all addresses of the array.

\* \* \* \* \*